United States Patent

[11] 3,604,661

| [72] | Inventor | Robert Alfred Mayer, Jr.<br>7727 Miller Fall Road, Rockville, Md. 20800 |
|---|---|---|
| [21] | Appl. No. | 861,042 |
| [22] | Filed | Sept. 25, 1969 |
| [45] | Patented | Sept. 14, 1971 |

[54] BOUNDARY LAYER CONTROL MEANS
6 Claims, 9 Drawing Figs.

[52] U.S. Cl. .................................................... 244/42, 114/67
[51] Int. Cl. .................................................... B64c 21/04
[50] Field of Search ......................................... 244/42, 42.4, .41, .43, .46, .47, .48, .50, 130; 114/67, 67.1

[56] References Cited
UNITED STATES PATENTS

| 1,831,697 | 11/1931 | Ziegler | 114/67 |
| 1,894,256 | 1/1933 | Canahl et al. | 114/67 |
| 2,873,931 | 2/1959 | Fleischmann | 244/42 |
| 3,075,489 | 1/1963 | Eichenberger | 114/67 |
| 3,191,572 | 6/1965 | Wilson | 114/67 X |
| 3,303,811 | 2/1967 | Giles | 114/67 |
| 3,435,796 | 4/1969 | Merrill | 114/67 |
| 3,467,348 | 9/1969 | Lemelson | 244/130 |
| 3,480,234 | 11/1969 | Cornish | 244/42 X |

Primary Examiner—Trygve M. Blix
Assistant Examiner—Carl A. Rutledge
Attorneys—Emory L. Groff and Emory L. Groff, Jr.

ABSTRACT: A vehicle movable through a fluid supporting medium includes an active system for controlling the layer of said fluid over at least a portion of the vehicle exterior surface. Parallel slots through the surface permit fluid under pressure to issue over the surface to reduce drag and improve lift and/or propulsion.

INVENTOR
ROBERT A. MAYER, JR.

BY

ATTORNEY

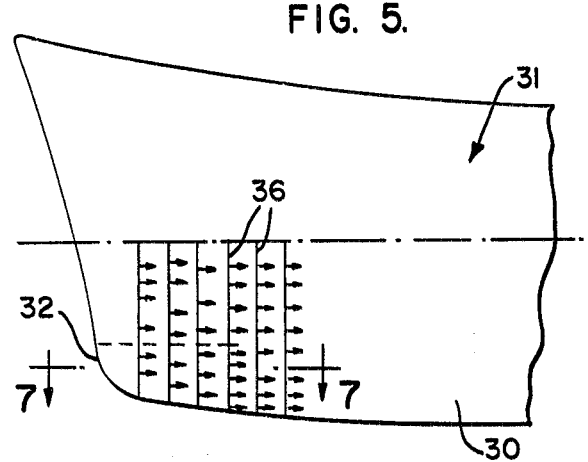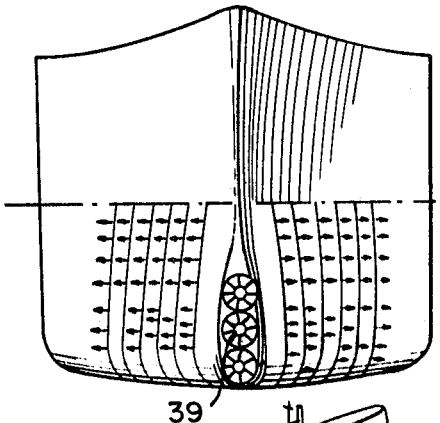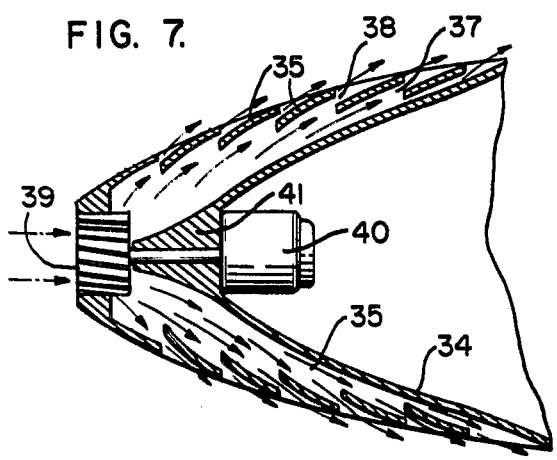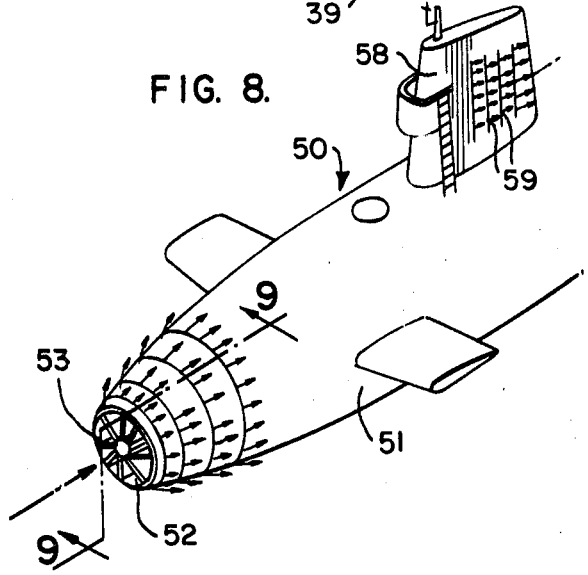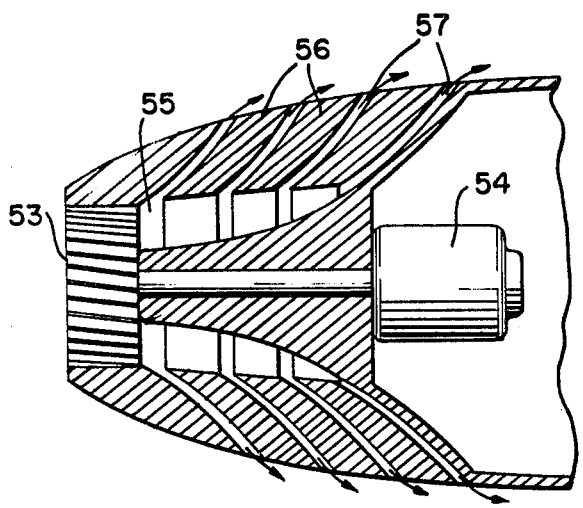
INVENTOR
ROBERT A. MAYER, JR.
BY
ATTORNEY

BOUNDARY LAYER CONTROL MEANS

This invention relates generally to means for improving the control and propulsion of vehicles in a fluid supporting medium by the regulation of the fluid boundary layer adjacent to at least a portion of the vehicle structure. More particularly, the specific invention concerns boundary layer control means comprising an active or positive fluid pressure system including a plurality of outlets or orifices of specific configuration which are strategically located on the vehicle structure and are adapted to increase the available lift in the case of aircraft and to reduce the drag in air as well as in water in the case of surface or underwater craft while also providing additional means for regulating the directional control of both craft supported by air and/or water.

The invention described herein consists of the novel and unique application of well-known physical principles to the problems of providing lift and motive force to vehicles in fluid media. Two primary applications for the invention have been identified, one for airborne craft and the other for waterborne vehicles.

It is well known that the predominant physical mechanism used to lift heavier-than-air craft is to move an appropriately contoured airfoil through the air rapidly enough to produce the lift required.

This lift is primarily created by the fluid in question, air, moving more rapidly across the upper surface of the airfoil than across the lower surface. As Bernoulli's principle explains, a lower pressure is created above the airfoil than below it and the resultant pressure differential creates the upward force known as lift.

Fixed-wing aircraft create the air flow over the wing by horizontal movement of the entire aircraft while rotary wing aircraft move the airfoil in circles in a horizontal plane to produce the desired lift. Although aircraft are being built which combine the general characteristics of helicopters and conventional aircraft, these combinations require relatively inefficient, heavy and complex mechanisms for low-speed (0—100 knots) flights or are incapable of high-speed (high subsonic and supersonic) flights.

The aircraft application of the invention being described would result in a vehicle having the following characteristics:
a. Conventional fixed wing design with all the attendant vehicle strength implied.
b. Vertical takeoff and landing capability.
c. Exceptionally stable low-speed flight characteristics are compared to conventional fixed-wing aircraft.
d. Unique dual noninterfering use of aircraft surfaces for low-speed and high-speed flight.
e. Simple and smooth transition from vertical to horizontal flight.
f. Minimal departure form accepted conventional aircraft design and manufacturing techniques.
g. Improved fuel consumption efficiency in vertical flight modes because of the extremely efficient means for providing vertical lift.
h. Low-speed and low level flight without any resultant downdraft.

Vehicles intended for low-speed, high-lift capacity, high-maneuverability operations currently performed by helicopters could be constructed in relatively unlimited sizes without the current rotor design problems of rotor stress, blade configuration selection, and the size and rotor speed trade-offs required because of inefficiencies as the rotor tips approach supersonic speeds. The reduced mechanical complexity of aircraft incorporating the invention being described in comparison with existing helicopters would result in economic advantages in the areas of maintenance and repair in addition to the reduction in initial production costs. An operational advantage would be that vertical vehicle travel could take place in limited physical clearance areas without the ever-present danger of rotor entanglement which is characteristic of present helicopters.

The water-borne-vehicle application of the present invention is concerned primarily with propulsion and control activities since support of the craft is seldom a problem in this medium. The envisioned use of the boundary layer control means of the invention would result in a water-borne vehicle having these characteristics:
a. Increased maneuverability through the use of quadrant control of the fluid-discharge ports (i.e. fluid discharge from the forward starboard quarter and aft port quarter of the hull would cause the ship to turn to starboard with the minimum of resultant forward speed).
b. Decreased drag and turbulence, by the control of the fluid flow in the boundary layer in the immediate vicinity of the ship's hull.
c. Elimination of the ship's rudder and conventional propeller which would reduce the ship's susceptibility to rough seas and some types of navigational hazards.
d. Increased propulsion efficiency by the reduction of hull drag and the improvement of contained and directed propulsive fluid flow. The same fluid discharge ports would provide propulsive force and drag-reduction influences.
e. Elimination of some of the functional restrictions on present hull designs which must take into account rudder and propeller effectiveness over a wide range of ship speeds.
f. Elimination of the need for the use of tugboats for large ships when maneuvering in restricted waters. Provision for moving directly sideways with no attendant forward motion could be implemented by providing opposing flow-discharge ports on each side of the ship.

Many systems have been known in the past for improving the lift capability and/or reducing the drag in vehicles designed to be propelled through a fluid medium. Many such systems are passive; that is, the control is obtained by means of one or more recesses or projections in the wing surface, for example, in the case of an aircraft, or in the hull of a ship in the case of a water-borne craft. In these prior known systems, no reaction occurs while the vehicle is at rest since the forward propulsion of the vehicle is required to produce the desired reaction. The present invention, on the other hand, is of the active type, that is, means are provided in the vehicle to insure a positive flow of the supporting fluid medium through a plurality of specially arranged outlets or ports such that a control of the boundary layer is achieved even while the vehicle is at zero forward speed in the supporting medium. This feature is of particular importance in the case of aircraft, and is of less general usefulness in watercraft.

The utility of the present invention is enhanced by its adaptability to various surfaces of a conventional aircraft as well as to the hull of both surface and submersible marine vehicles. In each such installation of the amount of modification required to the vehicle structure is held to a minimum since the subject control system is intended to be practiced with the more or less conventional surface configuration presently found in air and watercraft Thus, it will be appreciated that although specific means are disclosed herein for the generation of the active control fluid, any other suitable arrangement may be utilized in combination with the novel subject fluid nozzles or outlets.

Accordingly, one of the objects of the present invention is to provide an improved boundary layer control means adapted to be utilized with both air as well as surface and submersible watercraft.

Another object of the present invention is to provide a boundary layer control system is an aircraft including a positive air-pressure means communicating with a plurality of laterally ejecting discharge ports extending longitudinally of the axis of flight upon the upper surface of the wings.

Still another object of the present invention is to provide directional control means on an aircraft comprising a plurality of longitudinally extending air-discharge ports on the fuselage thereof.

A further object of the present invention is to provide an aircraft boundary layer control system including a plurality of air-discharge ports on the upper surface of the wings thereof, which ports are disposed in a stepped manner extending downwardly from the aircraft fuselage to the tip of the wing.

A further object of the present invention is to provide a boundary layer control system for the hull of a marine craft comprising a plurality of vertically extending and rearwardly discharging fluid ports.

With these and other objects in view which will more readily appear as the nature of the invention is better understood, the invention consists in the novel construction, combination and arrangement of parts hereinafter more fully described, illustrated and claimed.

A preferred and practical embodiment of the invention is shown in the accompanying drawings, in which:

FIG. 5 is a partial side elevation and illustrates the boundary layer control system of the present invention as applied to a water-borne craft.

FIG. 6 is a front elevation of the structure shown in FIG. 5.

FIG. 7 is a horizontal sectional view taken along the line 7—7 of FIG. 5.

FIG. 8 is a perspective view illustrating the boundary layer control system of the present invention as applied to a submersible watercraft.

FIG. 9 is a longitudinal sectional view taken along the line 9—9 of FIG. 8.

Similar reference characters designate corresponding parts throughout the several views of the drawings.

Figure 1:
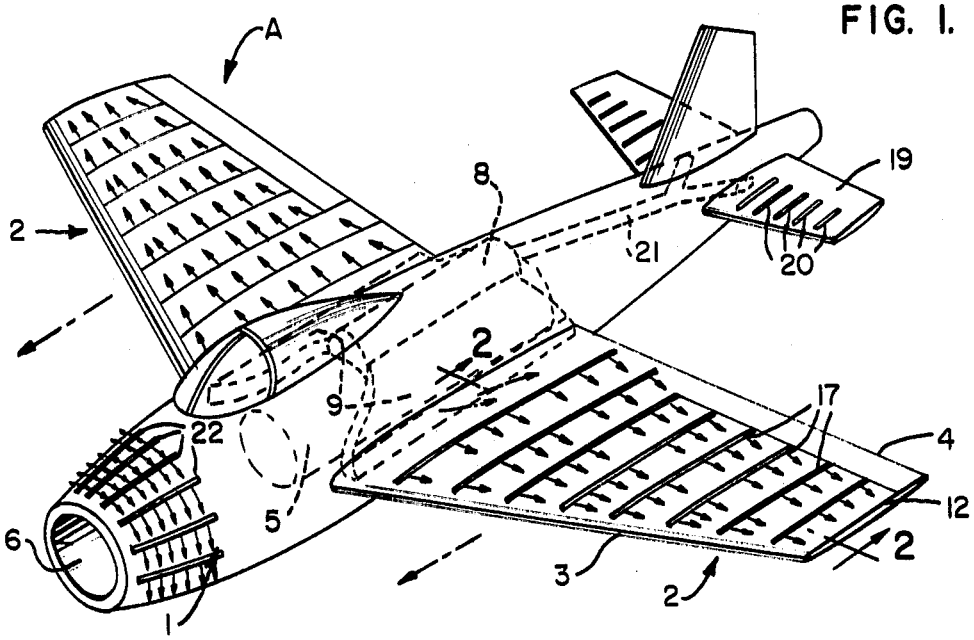
FIG. 1 is a perspective view of the boundary layer control system of the present invention as applied to an aircraft.

Referring now generally to the drawings, it will be seen that the boundary layer control system of this invention may be utilized in combination with numerous types of vehicles. FIGS. 1–4 illustrate an embodiment wherein the system is applied to an aircraft, while FIGS. 5–7 show a manner of utilizing the system in a surface water-borne craft, and finally the concept is disclosed in FIGS. 8 and 9 in a submersible watercraft.

From a general examination of the various figures of the drawings, several common aspects will be apparent among the numerous embodiments. In each instance means are included for providing a positive flow of the vehicle-supporting fluid medium through one or more chambers provided within the interior of the vehicle structure even though the vehicle remains at zero forward speed. Similarly, it will be seen that these chambers communicate with a plurality of fluid-discharge ports or orifices which are parallel to one another and have their exit portions disposed adjacent to a boundary layer area of the craft structure.

The embodiment illustrated in FIGS. 1–4 discloses a heavier-than-air aircraft, generally designated A, and which may include any conventional type of fuselage 1 and wings 2—2 each provided with a rounded leading edge 3 and tapered trailing edge 4. In the example illustrated in FIG. 1, thrust is provided for the aircraft A by means of any type of jet engine 5 which receives its air supply from the air inlet 6 in the nose of the fuselage 1.

It will be understood that any suitable aircraft configuration may be employed in utilizing the present control system thereby emphasizing that this system does not require drastic departures from conventional fuselage and wing design. This statement should not be construed to be contradicted by the illustration of FIG. 2 which discloses a stepped arrangement for the top of the wing, 2, since the airfoil of each of the upper wing surface sections, 7, will be seen to be conventional when viewed in FIG. 3.

Mounted in proximity to the engine, 5, is a primary pressure chamber, 8, adapted to provide a controllable volume of air at relatively high velocity. This air may most conveniently be received as a byproduct of the operation of the engine, 5, or alternately may be independently received from the air inlet 6 in which latter case separate power blower means (not shown) would be required to produce the necessary high-velocity airflow which would not otherwise be available when the aircraft was at rest or travelling at slow speed such as during taxiing, takeoffs, climbing and landing. Distribution means such as the wing supply ducts 9—9 serve to deliver controlled volumes of air at a high velocity from the primary pressure chamber 8 to the interior of each of the wings 2—2. As shown most clearly in FIG. 2, each of the wing interiors is constructed with a plurality of ribs 10 provided with a central opening, 11, encompassing the major portion of the wing interior cross section such that a plenum is established extending substantially to the tip 12 of each wing and comprising a plurality of wing chamber sections, 13, defined by each pair of adjacent ribs, 10. Most wing sections presently in use taper in cross-sectional area from the fuselage of the aircraft to the wing tip. This taper occurs both vertically and horizontally, and accordingly, it will follow that the resultant interior configuration of the wing is one of a progressively decreasing cross-sectional area from the fuselage to the tip and this feature in itself serves to assist in insuring a constant air volume throughout the length of the wing; however, as will be seen in FIG. 2, each wing chamber section, 13, is bounded at its upper limit by an inclined baffle, 14, which defines, together with the spaced-apart upper wing surface section, 7, a discharge chamber, 15, located above each wing chamber section, 13. An inlet 16 to each discharge chamber 15 is formed at the inboard edge of each baffle 14 while the outlet of each discharge chamber 15 will be seen to comprise an elongated discharge port or slot 17 which extends for substantially the majority of the longitudinal extent of the upper wing surface in a direction substantially parallel to the longitudinal axis of the aircraft fuselage 1. As will be seen in FIG. 2, the interior of each wing section 7 provides a smooth surface adjacent the chambers 15 and at the intersection with the ribs 10 in order to reduce to a minimum any restriction to the fluid flow.

Figure 2:
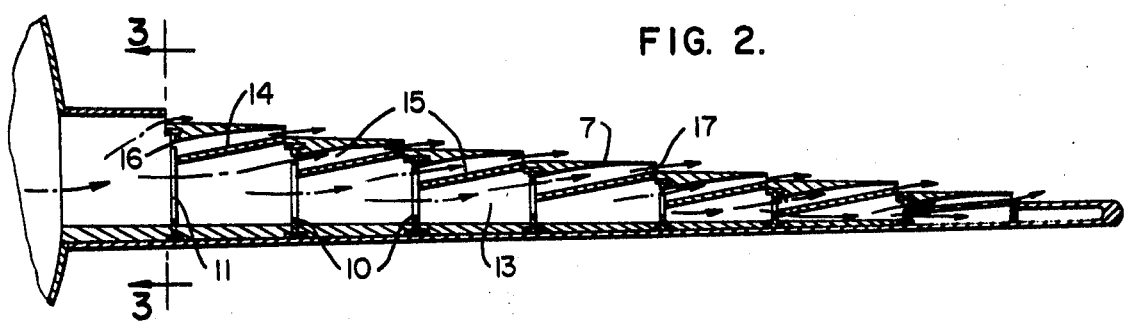
FIG. 2 is a longitudinal sectional view taken along the line 2—2 of FIG. 1.
Figure 3:
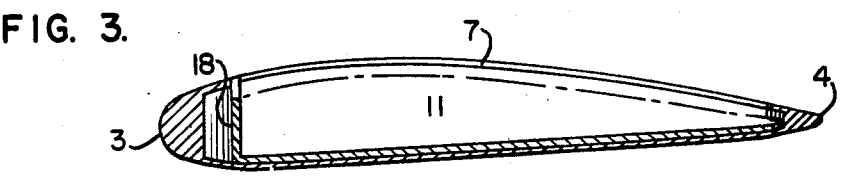
FIG. 3 is a transverse sectional view along the line 3—3 of FIG. 2.

In connection with the exemplification of the fluid-distribution system, it will be apparent that the positioning and inclination of the baffles 14 may be chosen to insure a constant velocity of discharging air from each of the slots 17 from the innermost one to the outermost one next adjacent the wingtip 12. The air pressure being delivered from the primary air pressure chamber 8 through the wing supply duct 9 to the plenum chamber formed by the plurality of wing chamber sections 13 will be determined by the cross-sectional area defined by each baffle 14 which likewise establishes the cross-sectional taper of the respective discharge chambers 15. The cross-sectional area presented by each of the fluid-discharge ports 17 could be varies throughout the length of each wing 2 in order to achieve a constant air velocity issuing from all of the slots 17. This approach is not desirable as it would require more expense during manufacture of the aircraft inasmuch as each upper wing surface section 7 would have to have a different configuration, whereas in the arrangement as shown in FIG. 2 the stepped placement of the edge of each upper wing surface section 7 adjacent each slot 17 is constant.

By the present arrangement it will be understood that as air is directed into the plenum within each wing 2 it is urged successively through each rib opening 11 and divided proportionately into each discharge chamber 15 from whence it issues in a straight direction from each fluid port 17 toward the tip 12 of the wing. In view of the substantially parallel relationship between each of the stepped upper wing surface sections 7 it will follow that this issuing air is positively urged across the top surface of the next adjacent wing surface section 7 and as this exited air proceeds over the next edge of the wing surface section 7 it will then continue to flow over the top of the air exiting from the adjacent slot 17, thus providing a cumulative effect of high-velocity air travelling toward the wingtip over the entire upper surface of the wing.

Figure 4:
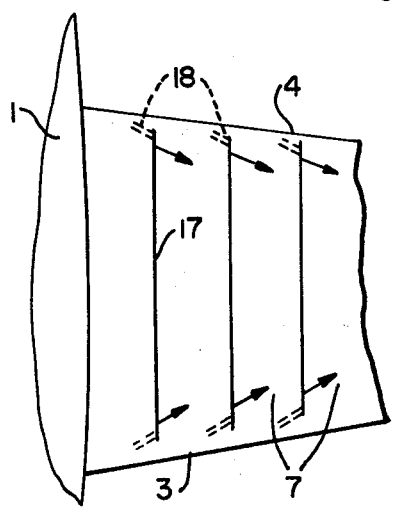
FIG. 4 is a fragmentary top plan view of a portion of the aircraft wing of FIG. 1.

In view of the tapered configuration of most aircraft wings from the fuselage to the tip thereof, means are provided to contain the active airflow induced by the present invention across the upper surface of the wing. As shown in FIG. 4, the leading and trailing portions of each slot 17 are bounded by a deflector means 18 extending inwardly from each slot exit portion into the respective discharge chamber 15 and inclined towards the adjacent leading edge 3 or trailing edge 4, respectively, such that air driven into each discharge chamber 15 impinges upon these deflectors 18 with a resultant component indicated by the arrows in FIG. 4 thereby serving to prevent spillage of the high-velocity air over the forward and trailing edges of each wing 4. This feature is designed to restrict the moving airstreams to the upper surface of the wing and to minimize any disturbance of the relatively nonmoving air beneath the wing, thus maximizing pressure differential between the upper and lower wing surfaces.

As shown in FIG. 1 of the drawings, the horizontal stabilizer 19 of the aircraft A may be provided with a plurality of similarly stepped and parallel fluid-discharge ports 20 upon the top surface thereof, which ports 20 are likewise provided with means in the form of a trail supply duct 21 to deliver a source of high-velocity air thereto from the primary pressure chamber 8.

Also shown in FIG. 1 are a plurality of control slots 22 substantially parallel to one another and provided in the upper portion of the forward area to the fuselage 1 in a generally parallel relationship to the fuselage longitudinal axis. It will be understood that suitable means such as that shown and heretofore described for supplying high-velocity air to the wings and stabilizer may also be provided for delivering controlled amounts of air to these slots 22 whereby directional control may be imparted to the aircraft such as variation of the pitch by issuing air from all of the slots 22, or regulation of the turning axis by alternately issuing air from these slots 22 only to the right or left of the fuselage centerline.

Upon consideration of the foregoing discussion, it will be apparent that alternative configurations of control slots particularly suitable for specific aircraft may also be employed to control pitch, yaw, and roll at low aircraft speeds. Such construction may include control slots below as well as above the horizontal stabilizer and/or above and below any point on the fuselage.

In the embodiment illustrated in FIGS. 5-7, it will be seen that the boundary layer control system of the present invention may be applied to the hull 30 of a water-borne craft such as the surface ship, generally designated 31. In this environment, the primary consideration involved in connection with improvement of the propulsion of the ship 31 through the water is reduction of drag as generated by movement of the hull through the water. In this connection, means are provided to create a boundary layer control with an active system including means to produce a positive flow of water in a rearward direction over at least the forward portion of the hull 30. Such means include an inlet 32 positioned in the forward part of the hull well below the waterline WL and extending rearwardly to communicate with a chamber 33 defined by the hull 30 and an inner chamber wall 34 as shown most clearly in FIG. 7. The portion of the hull opposite the chamber walls 34 is constructed to provide a plurality of blades 35 which are angled or otherwise shaped to form a plurality of rearwardly directed discharge slots or ports 36. By maintaining the exit edge 37 of each blade 35 in the normal plane of the adjacent hull 30 while positioning the inlet edge 38 of each blade 35 in an inward position spaced from the next adjacent edge 37 as shown in FIG. 7, a smooth flow of water will be possible from the inlet 32 through the chamber 33 and outwardly between the angled blades 35 and over the outermost surfaces of these blades toward the rear of the hull 30. In order to achieve the maximum drag reduction, active water-transmission means such as one or a plurality of turbines 39 are positioned within the inlet 32 and driven by a suitable motor 40 with an appropriate fairing 41 serving to insure a smooth continuous movement of the water from the turbine 39 rearwardly into each portion of the chamber 33.

Most advantageously, each of slots or ports 36 extends downwardly and vertically from the waterline WL around the bottom of the hull 30 and upwardly and vertically to the waterline on the other side of the ship 31, and it will be understood that any number of the slots 36 may be utilized even throughout the entire length of the ship with a resultant substantial increase in the thrust being delivered to the ship. Also it will follow that the top portion of each slot 36 may be provided with a deflector (not shown) such as the deflectors 18 in the first-described embodiment in order to contain all of the high-velocity water flow issuing from the slots 36 in the area below the waterline.

The other modification as shown in FIGS. 8 and 9 illustrates an application of the present invention to the hull of a submersible vessel such as the submarine 50. This embodiment is analogous to that just described relating to the surface ship 31 in that the hull 51 of the submarine 50 is provided with an inlet 52 in the forward nose thereof, which inlet houses a turbine 53 driven by any suitable motor 54 such that a high volume of water will be delivered to the chamber 55. As shown most clearly in FIG. 9, the forward portion of the hull 51 includes a plurality of rings 56 which are mounted by any suitable means (not shown) to provide a plurality of slots or ports 57 each of which is directed rearwardly of the nose of the submarine at its exit portion and communicates at its inlet portion with the chamber 55 whereby upon actuation of the motor 54 the turbine 53 will drive a high volume of water into the chamber 55 and thence through each of the slots 57 and outwardly through the exit ports at a high velocity and over the skin of the adjacent portion of the hull 51.

Additionally, the tower 58 of the submarine may be provided with a plurality of vertically disposed fluid discharge ports or slots 59 on both sides of the tower constructed in a manner similar to the slots 36 in the hull 30 of FIG. 5 whereby when submerged, water may be directed rearwardly from these slots to reduce drag and increase thrust. The active water supply for this operation may be delivered from the forward hull chamber 55 or by a separate inlet and turbine (not shown) located in the forward edge of the tower 58. Quite obviously, the same slots 59 can serve to provide control of the craft about its roll axis by selectively issuing water from only those slots on the right or left side of the tower.

As discussed in connection with the earlier-mentioned aircraft embodiment of the invention, it will be appreciated that in the case of the water-borne vehicle, it is also possible to control the pitch and yaw motions by means of regulation of appropriate discharge slots. It will likewise be understood that the slots in both embodiments of the water-borne craft may be disposed in other angular relationships with respect to the direction of vessel travel than the vertical arrangement shown. For example, horizontal or inclined slots may be provided through the hull of the ship or submarine and slots similar to the slots 20 on the tail of the aircraft may be provided upon the horizontal stabilizer of the submersible craft 50.

I claim:
1. In an aircraft, an extended body member provided with leading and trailing edges and having an exterior surface disposed substantially parallel to the direction of movement of the aircraft when in forward motion, said surface having a plurality of elongated parallel and laterally spaced-apart fluid-discharge slots therethrough, said slots extending between points adjacent said leading and trailing edges and disposed with their longitudinal axes substantially parallel to the normal forward direction of the aircraft movement, each said slot having an exit portion directed laterally and away from the aircraft centerline towards the outer extremity of said extended body member, said laterally directed exit portions of successive ones of said slots disposed in a progressively stepped manner from the aircraft centerline to said extended member outer extremity, and means within said aircraft generating a high-velocity flow of fluid medium and directing sail flow interiorly of said body member to said slot exit portions, whereby said fluid flow exits said slots and is directed over, in a juxtaposed manner, that portion of said surface between said slots and between said leading and trailing edges.

2. An aircraft according to claim 1 wherein, said body member comprises a wing of said aircraft and said exterior surface is said wing upper surface.

3. An aircraft according to claim 1 wherein, said body member comprises a horizontal stabilizer of said aircraft and said exterior surface is said stabilizer upper surface.

4. An aircraft according to claim 1 including additional fluid-discharge slots longitudinally disposed in the forward portion of the fuselage of the aircraft and said additional slots also communicating with said fluid-flow-generating means.

5. An aircraft according to claim 2 wherein, said body member further includes a horizontal stabilizer of said aircraft and said exterior surface additionally includes the upper surface of said stabilizer.

6. The invention according to claim 1, including deflector means adjacent the forward and trailing limits of each said slot and said deflector means directs fluid flow issuing from the limits of said slots towards the centerline of said wing.